United States Patent
Sato et al.

(10) Patent No.: US 10,001,213 B2
(45) Date of Patent: Jun. 19, 2018

(54) TRANSMISSION AND CONTROL METHOD OF TRANSMISSION

(71) Applicant: JATCO Ltd, Fuji-shi, Shizuoka (JP)

(72) Inventors: Masashi Sato, Atsugi (JP); Hideshi Wakayama, Hadano (JP); Mamiko Inoue, Ebina (JP); Kousuke Waku, Hadano (JP); Hyuk Park, Seoul (KR)

(73) Assignee: JATCO Ltd, Fuji-Shi (JP)

( * ) Notice: Subject to any disclaimer, the term of this patent is extended or adjusted under 35 U.S.C. 154(b) by 200 days.

(21) Appl. No.: 14/893,252

(22) PCT Filed: May 20, 2014

(86) PCT No.: PCT/JP2014/063284
§ 371 (c)(1),
(2) Date: Nov. 23, 2015

(87) PCT Pub. No.: WO2014/192582
PCT Pub. Date: Dec. 4, 2014

(65) Prior Publication Data
US 2016/0097450 A1  Apr. 7, 2016

(30) Foreign Application Priority Data

May 30, 2013  (JP) ................................ 2013-114641

(51) Int. Cl.
*F16H 37/02*  (2006.01)
*F16H 61/662*  (2006.01)
*F16H 61/70*  (2006.01)

(52) U.S. Cl.
CPC ..... *F16H 61/66231* (2013.01); *F16H 37/022* (2013.01); *F16H 61/66259* (2013.01);
(Continued)

(58) Field of Classification Search
CPC ......... F16H 61/66231; F16H 2037/023; F16H 37/021; F16H 61/70
See application file for complete search history.

(56) References Cited

U.S. PATENT DOCUMENTS

2005/0096822 A1  5/2005  Aoki
2010/0222971 A1*  9/2010  Takahashi ............... F16H 61/08
                                                                  701/51

(Continued)

FOREIGN PATENT DOCUMENTS

JP  05-332426 A  12/1993
JP  2005-140174 A  6/2005
(Continued)

*Primary Examiner* — Stacey Fluhart
(74) *Attorney, Agent, or Firm* — Foley & Lardner LLP

(57) ABSTRACT

A transmission including a variator capable of continuously changing a speed ratio, a stepped transmission mechanism arranged in series with the variator and in which a gear position is switched and a shifting control unit executing stepped shifting repeatedly performing a shifting suppression phase and an upshift phase when a stepped upshift shifting condition is satisfied is provided, and the shifting control unit completes a change from an n-th gear position of the stepped transmission mechanism to an n+1 gear position if the stepped transmission mechanism is at the n-th gear position before the through speed ratio reaches a Highest speed ratio of the variator when the stepped shifting is performed.

6 Claims, 6 Drawing Sheets

(52) U.S. Cl.
CPC .......... *F16H 37/021* (2013.01); *F16H 61/702* (2013.01); *F16H 2037/023* (2013.01)

(56) References Cited

U.S. PATENT DOCUMENTS

| | | | |
|---|---|---|---|
| 2010/0248895 A1* | 9/2010 | Jozaki | F16H 61/66259 477/44 |
| 2011/0015033 A1* | 1/2011 | Nonomura | F16H 61/66259 477/37 |
| 2011/0015835 A1* | 1/2011 | Takahashi | F16H 61/061 701/55 |
| 2011/0015838 A1* | 1/2011 | Takahashi | F16H 61/08 701/55 |
| 2011/0015839 A1* | 1/2011 | Takahashi | F16H 61/061 701/55 |
| 2011/0015840 A1* | 1/2011 | Takahashi | F16H 61/061 701/58 |
| 2012/0059556 A1 | 3/2012 | Tanaka et al. | |

FOREIGN PATENT DOCUMENTS

| | | | |
|---|---|---|---|
| JP | 2010-007749 A | 1/2010 | |
| JP | 2012-057710 A | 3/2012 | |

\* cited by examiner

TRANSMISSION AND CONTROL METHOD OF TRANSMISSION

TECHNICAL FIELD

The present invention relates to a transmission and a control method of a transmission.

BACKGROUND ART

JP5-332426A discloses a continuously variable transmission which changes a speed ratio in steps (hereinafter referred to as stepped shifting) so that a vehicle speed is increased by repeating a gradual increase of an engine rotation speed (hereinafter referred to as a shifting suppression phase) and a rapid decrease (hereinafter referred to as an upshift phase) when there is a request for rapid acceleration.

Moreover, JP2012-57710A discloses a continuously variable transmission provided with a variator capable of continuously changing a speed ratio and an auxiliary transmission mechanism performing stepped shifting.

SUMMARY OF INVENTION

By combining the aforementioned continuously variable transmissions, it can be so constituted that a gear position of the auxiliary transmission mechanism is fixed, and stepped shifting is performed by the variator in a continuously variable transmission provided with the variator and the auxiliary transmission mechanism.

In the stepped shifting, by repeatedly performing the increase of the engine rotation speed and the upshifting, a feeling of acceleration with a good rhythmic sense can be given to a driver.

However, if a gear position of the auxiliary transmission mechanism is at an n-th gear position, when the speed ratio of the variator is the Highest, the variator cannot perform upshifting any more.

Thus, if the speed ratio of the variator becomes the Highest during the upshift phase, a predetermined upshift amount cannot be obtained during the upshift phase, which might give a sense of discomfort to the driver.

In response to that, the predetermined upshift amount can be obtained during the upshift phase by switching the gear position of the auxiliary transmission mechanism from the n-th gear position to the n+1 gear position when the speed ratio of the variator becomes the Highest and by changing the variator to a Low side.

Switching of the gear position of the auxiliary transmission mechanism in a state in which an accelerator pedal is stepped on is performed in the order of a preparation phase, a torque phase, an inertia phase, and an end phase, and a change of a rotation speed of the auxiliary transmission mechanism (change of a speed ratio) is made in the inertia phase. Therefore, in order to start the inertia phase at the same time as the time when the speed ratio of the variator becomes the Highest, the preparation phase and the torque phase need to have been finished by that time.

However, even if the auxiliary transmission mechanism is controlled so that the inertia phase is started at the same time as the time when the speed ratio of the variator becomes the Highest, fluctuation in an actual hydraulic pressure with respect to an instructed hydraulic pressure to the auxiliary transmission mechanism may expedite start timing of the inertia phase in some cases. In this case, the upshift by the variator and the switching of the gear position by the auxiliary transmission mechanism occur at the same time in the upshift phase, a change rate of a through speed ratio which is a speed ratio of the entire continuously variable transmission combining the speed ratio in the variator and the speed ratio in the auxiliary transmission mechanism temporarily becomes large, which might give a sense of discomfort to the driver.

On the other hand, if the start timing of the inertia phase is delayed, the switching of the gear position in the auxiliary transmission mechanism occurs after the upshift of the speed ratio of the variator to the Highest, which means that the upshift is made in two stages in a short period of time and it might give a sense of discomfort to the driver.

The present invention was made in order to solve the aforementioned problems and has an object to suppress a sense of discomfort given to a driver when stepped shifting is performed.

A transmission according to an aspect of the present invention is a transmission including a variator capable of continuously changing a speed ratio; a stepped transmission mechanism arranged in series with the variator and in which a gear position is switched; and a shifting control unit adapted to control a through speed ratio by controlling the variator and the stepped transmission mechanism and to execute stepped shifting by performing repeatedly a shifting suppression phase and an upshift phase if a stepped upshift shifting condition is satisfied, the through speed ratio being a speed ratio as the entire transmission, a change of the through speed ratio being suppressed in the shifting suppression phase, a change of the through speed ratio of the upshift phase being larger than that of the shifting suppression phase, wherein the shifting control unit completes a change from an n-th gear position of the stepped transmission mechanism to an n+1 gear position before the through speed ratio reaches a Highest speed ratio of the variator if the stepped transmission mechanism is at the n-th gear position when the stepped shifting is performed.

A control method according to another aspect of the present invention is control method for controlling a transmission provided with: a variator capable of continuously changing a speed ratio; and a stepped transmission mechanism arranged in series with the variator and in which a gear position is switched, including: controlling a through speed ratio by controlling the variator and the stepped transmission mechanism, the through speed ratio being a speed ratio as the entire transmission; executing stepped shifting adapted to repeatedly perform a shifting suppression phase and an upshift phase if a stepped upshift shifting condition is satisfied, a change of the through speed ratio being suppressed in the shifting suppression phase, a change of the through speed ratio of the upshift phase being larger than that of the shifting suppression phase; and completing a change from an n-th gear position of the stepped transmission mechanism to an n+1 gear position before the through speed ratio reaches a Highest speed ratio of the variator if the stepped transmission mechanism is at the n-th gear position when the stepped shifting is performed.

According to these aspect, when the through speed ratio reaches the Highest speed ratio of the variator at the n-th gear position, the gear position of the stepped transmission mechanism is at the n+1 gear position, and the through speed ratio can be changed to a High side from the Highest speed ratio of the variator at the n-th gear position, and stepped transmission can be performed without giving a sense of discomfort to the driver.

DESCRIPTION OF EMBODIMENTS

An embodiment of the present invention will be described by referring to the attached drawings. In the description below, a "speed ratio" of a transmission mechanism is a value obtained by dividing an input rotation speed of the transmission mechanism by an output rotation speed of the transmission mechanism. Moreover, a "Lowest speed ratio" is a maximum speed ratio of the transmission mechanism used at start of a vehicle and the like. A "Highest speed ratio" is a minimum speed ratio of the transmission mechanism.

Figure 1:
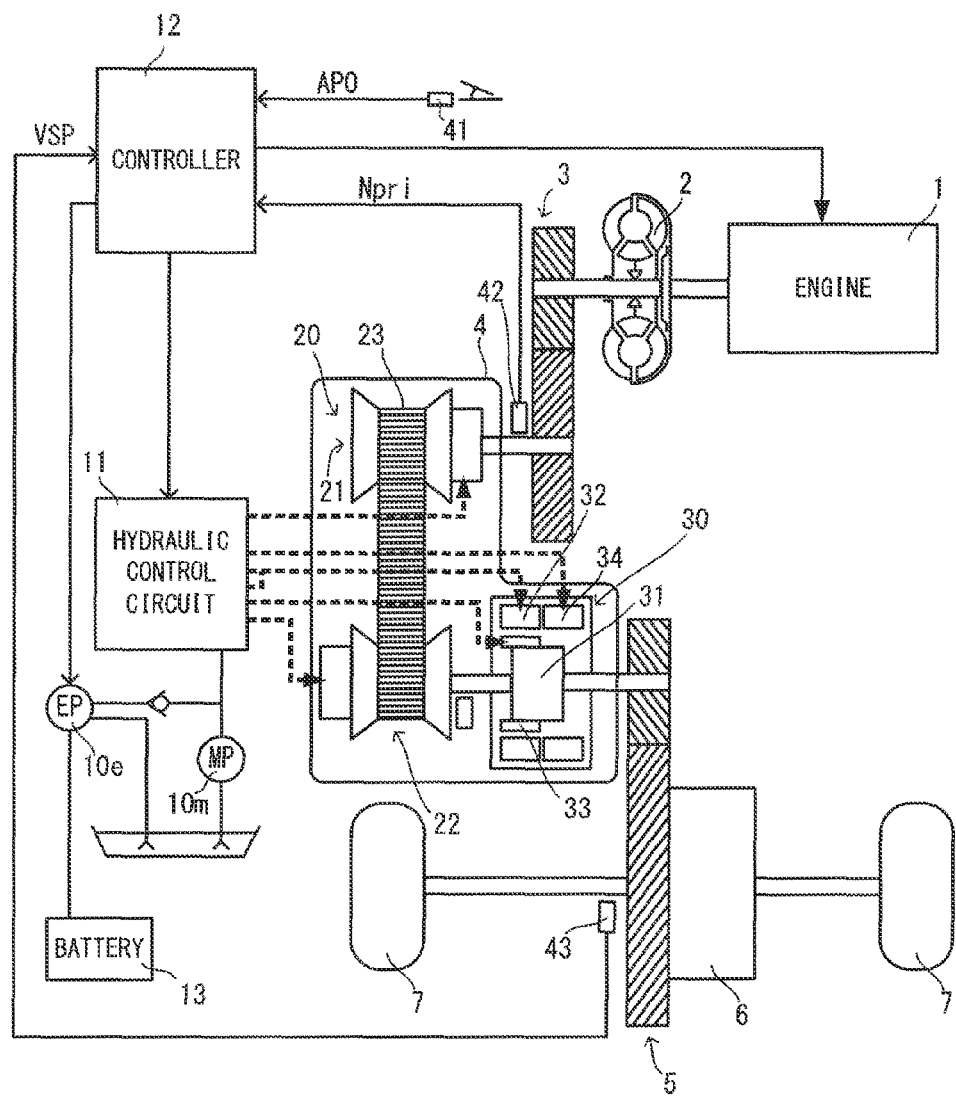
FIG. 1 is an outline configuration diagram of a vehicle of this embodiment.

FIG. 1 is an outline configuration diagram of a vehicle according to this embodiment. This vehicle includes an engine 1 as a driving source, and an output rotation of an engine 1 is transmitted to a driving wheel 7 through a torque converter 2 with a lockup clutch, a first gear train 3, a continuously variable transmission (hereinafter referred to simply as a "transmission 4"), a second gear train 5, and a differential device 6.

In the transmission 4, a mechanical oil pump 10m to which a rotation of the engine 1 is input and which is driven by using a part of power of the engine 1 and an electric oil pump 10e driven by receiving power supply from a battery 13 are provided. Moreover, in the transmission 4, a hydraulic control circuit 11 for controlling a hydraulic pressure from the mecha-oil pump 10m or the electric oil pump 10e and to be supplied to each portion of the transmission 4 is provided.

The transmission 4 includes a belt-type continuously variable transmission mechanism (hereinafter referred to as a "variator 20") and an auxiliary transmission mechanism 30 provided in series in the variator 20. The phrase "provided in series" means that the variator 20 and the auxiliary transmission mechanism 30 are provided in series in a power transmission path from the engine 1 to the driving wheel 7. The auxiliary transmission mechanism 30 may be directly connected to an output shaft of the variator 20 as in this example or may be connected through another transmission or a power transmission mechanism (a gear train, for example). Alternatively, the auxiliary transmission mechanism 30 may be connected to a front stage (input shaft side) of the variator 20.

The variator 20 includes a primary pulley 21, a secondary pulley 22, and a V belt 23 stretched between the pulleys 21 and 22. The variator 20 continuously changes a speed ratio by supplying/discharging a hydraulic pressure to/from the primary pulley 21 and the secondary pulley 22.

The auxiliary transmission mechanism 30 is a transmission mechanism with forward 2 stages/reverse 1 stage. The auxiliary transmission mechanism 30 includes a Ravigneau planetary gear mechanism 31 connecting carriers of two planetary gears and a plurality of friction engagement elements connected to a plurality of rotating elements constituting the Ravigneau planetary gear mechanism 31 and changing their linkage states (Low brake 32, High clutch 33, Rev brake 34). When a supply hydraulic pressure to each of the friction engagement elements 32 to 34 is adjusted, and an engaged/disengaged state of each of the friction engagement elements 32 to 34 is changed, the gear position of the auxiliary transmission mechanism 30 is changed. In the description below, if the gear position of the auxiliary transmission mechanism 30 is a first speed, it is expressed as that "the transmission 4 is in a low-speed mode", and if it is a second speed, it is expressed as that "the transmission 4 is in a high-speed mode". Switching of the gear position from the first speed to the second speed of the auxiliary transmission mechanism 30 in a state in which an accelerator pedal is stepped on by a driver progresses in the order of a preparation phase, a torque phase, an inertia phase, and an end phase.

In the preparation phase, pre-charging of the hydraulic pressure to an engagement-side friction engagement element is performed, and the engagement-side friction engagement element is made to standby in a state immediately before engagement. In the torque phase, the supply hydraulic pressure to a disengagement-side friction engagement element is lowered, and a supply hydraulic pressure to the engagement-side friction engagement element is increased so that the friction engagement element in charge of torque transmission is switched from the disengagement-side friction engagement element to the engagement-side friction engagement element. In the inertia phase, the speed ratio is changed from the speed ratio of the gear position before shifting to the speed ratio of the gear position after the shifting. In the end phase, the supply hydraulic pressure to the disengagement-side friction engagement element is made zero, the disengagement-side friction engagement element is fully disengaged, and at the same time, the supply hydraulic pressure to the engagement-side friction engagement element is increased, and the engagement-side friction engagement element is fully engaged.

Figure 2:
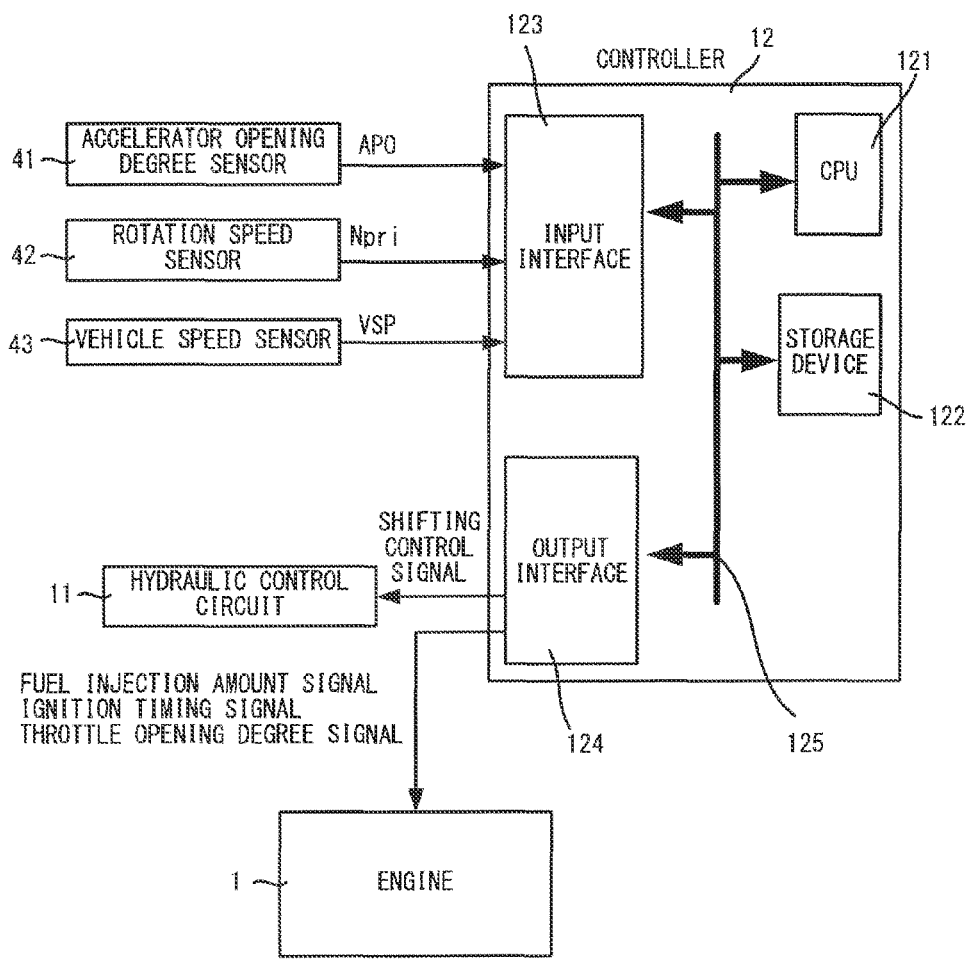
FIG. 2 is an outline configuration diagram of a controller.

A controller 12 is a controller for integrally controlling the engine 1 and the transmission 4 and as illustrated in FIG. 2, is constituted by a CPU 121, a storage device 122 composed of RAM/ROM, an input interface 123, an output interface 124, and a bus 125 mutually connecting them.

Into the input interface 123, an output signal of an accelerator opening degree sensor 41 for detecting an accelerator opening degree APO which is an operation amount of the accelerator pedal, an output signal of a rotation speed sensor 42 for detecting an input rotation speed of the transmission 4 (=a rotation speed of the primary pulley 21, hereinafter referred to as a "primary rotation speed Npri"), an output signal of a vehicle speed sensor 43 for detecting a vehicle speed VSP and the like are input.

In the storage device 122, a control program of the engine 1, a shifting control program of the transmission 4, and various maps and tables used in these programs are stored. The CPU 121 reads out and executes the program stored in the storage device 122, executes various calculation processing to the various signals input through the input interface 123, generates a fuel injection amount signal, an ignition timing signal, a throttle opening degree signal, a shifting control signal, a driving signal of the electric oil pump 10e and the like and outputs the generated signals to the engine 1, the hydraulic control circuit 11, and a motor driver of the electric oil pump 10e through the output interface 124. The various values and their calculation results used by the CPU 121 in the calculation processing are stored in the storage device 122 as appropriate.

The hydraulic control circuit 11 is constituted by a plurality of channels and a plurality of hydraulic control valves. The hydraulic control circuit 11 switches a supply path of the hydraulic pressure by controlling the plurality of hydraulic control valves on the basis of the shifting control signal from the controller 12 and adjusts a required hydraulic pressure from a hydraulic pressure generated in the mecha-oil pump 10m or the electric oil pump 10e and supplies it to each portion of the transmission 4. As a result, the speed ratio of the variator 20 and the gear position of the auxiliary transmission mechanism 30 are changed, and shifting of the transmission 4 is performed.

Figure 3:
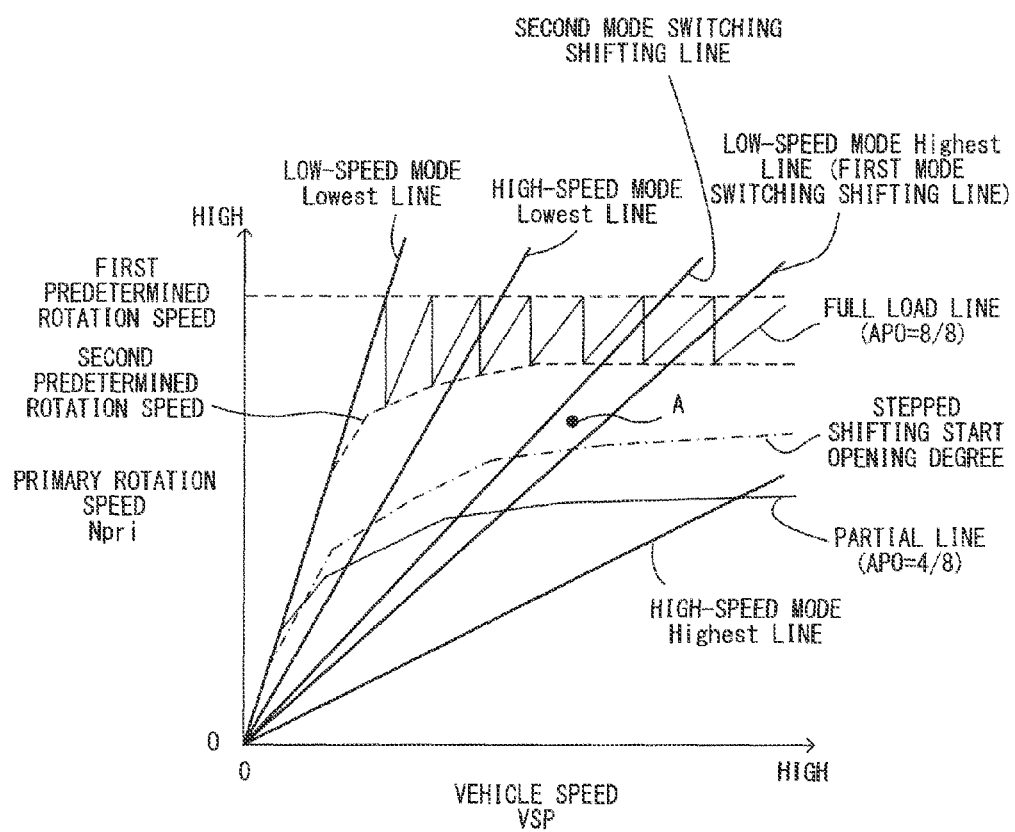
FIG. 3 is a shifting map stored in a storage device.

FIG. 3 illustrates an example of a shifting map stored in the storage device 122. The controller 12 controls the variator 20 and the auxiliary transmission mechanism 30 in accordance with an operation state of the vehicle (the vehicle speed VSP, the primary rotation speed Npri, the accelerator opening degree APO in this embodiment) on the basis of this shifting map.

In this shifting map, an operation point of the transmission 4 is defined by the vehicle speed VSP and the primary rotation speed Npri. Inclination of a line connecting the operation point of the transmission 4 and a zero point at a lower left corner of the shifting map corresponds to a through speed ratio which is a speed ratio of the entire transmission 4 (a speed ratio obtained by multiplying the speed ratio of the variator 20 and the speed ratio of the auxiliary transmission mechanism 30).

If the transmission 4 is in the low-speed mode, the transmission 4 is capable of shifting between a low-speed mode Lowest line obtained by setting a speed ratio of the variator 20 to a Lowest speed ratio and a low-speed mode Highest line obtained by setting the speed ratio of the variator 20 to a Highest speed ratio. On the other hand, if the transmission 4 is in the high-speed mode, the transmission 4 is capable of shifting between a high-speed mode Lowest line obtained by setting the speed ratio of the a variator 20 to the Lowest speed ratio and a high-speed mode Highest line obtained by setting the speed ratio of the variator 20 to the Highest speed ratio.

The speed ratio of each gear position of the auxiliary transmission mechanism 30 is set so that a speed ratio corresponding to the case in which the variator 20 is at the Highest in the low-speed mode (first speed) (low-speed mode Highest speed ratio) becomes smaller than the speed ratio corresponding to the case in which the variator 20 is at the Lowest in the high-speed mode (second speed) (high-speed mode Lowest speed ratio). As a result, a range of the through speed ratio of the transmission 4 that can be taken in the low-speed mode and a range of the through speed ratio of the transmission 4 that can be taken in the high-speed mode are partially overlapped with each other, and if the operation point of the transmission 4 is in a region sandwiched by the high-speed mode Lowest line and the low-speed mode Highest line, the transmission 4 can select either of the low-speed mode and the high-speed mode.

The controller 12 performs normal shifting if the accelerator opening degree APO is smaller than the stepped shifting start opening degree according to the vehicle speed VSP, while it performs stepped shifting if the accelerator opening degree APO becomes larger than the stepped shifting start opening degree according to the vehicle speed VSP. The stepped shifting start opening degree is an accelerator opening degree set in advance according to the vehicle speed VSP and is set to a degree determined that the driver intends to make acceleration.

In the normal shifting, similarly to the shifting map of the prior-art belt-type continuously variable transmission, shifting is performed on the basis of a shifting line set for each accelerator opening degree APO. For simplification, only a partial line (a shifting line in the case of the accelerator opening degree APO=4/8) is illustrated in FIG. 3.

In the normal shifting, a first mode switching shifting line at which the gear position of the auxiliary transmission mechanism 30 is switched is set to overlap the low-speed mode Highest line. The through speed ratio corresponding to the first mode switching shifting line is set to a value equal to the low-speed mode Highest speed ratio. The first mode switching shifting line is set as above because the smaller the speed ratio of the variator 20 is, the smaller the input torque to the auxiliary transmission mechanism 30 becomes, whereby a shifting shock when the auxiliary transmission mechanism 30 is shifted can be suppressed.

Then, when the operation point of the transmission 4 crosses the first mode switching shifting line, that is, when a target through speed ratio changes across the first mode switching shifting line, the controller 12 performs coordinated shifting which will be described below and performs switching between the high-speed mode and the low-speed mode.

In the coordinated shifting, the controller 12 performs shifting of the auxiliary transmission mechanism 30 and also changes the speed ratio of the variator 20 to a direction opposite to that in which the speed ratio of the auxiliary transmission mechanism 30 changes. At this time, the inertia phase in which the speed ratio of the auxiliary transmission mechanism 30 actually changes is synchronized with the period in which the speed ratio of the variator 20 changes. The speed ratio of the variator 20 changes in the direction opposite to that of the change of the speed ratio of the auxiliary transmission mechanism 30 so as not to give a shock caused by switching of the gear position of the auxiliary transmission mechanism 30 to the driver. In the coordinated shifting, a change amount of the speed ratio of the variator 20 is set to a change amount of the speed ratio by the gear position switching of the auxiliary transmission mechanism 30, and as a result, the through speed ratio is not changed.

Specifically, if the target through speed ratio changes across the first mode switching shifting line from the Low side to the High side, the controller 12 changes the gear position of the auxiliary transmission mechanism 30 from the first speed to the second speed (1-2 shifting) and also changes the speed ratio of the variator 20 to the Low side.

In the stepped shifting, a shifting suppression phase and an upshift phase are repeatedly performed.

A change rate of the speed ratio in the speed ratio suppression phase (a change amount of the speed ratio per unit time) is smaller than the change rate of the speed ratio in the upshift phase. In this embodiment, in the shifting suppression phase, the change rate of the speed ratio is zero, and the through speed ratio is not changed. In the shifting suppression phase, shifting by the variator 20 and the auxiliary transmission mechanism 30 can be made, but the through speed ratio is held constant. In the shifting suppression phase, the change rate of the speed ratio may be made larger than zero, and in this case, the change rate of the speed ratio is set within a range in which the primary rotation speed Npri is not lowered with the increase of the vehicle speed VSP during the shifting suppression phase.

In the upshift phase, the through speed ratio is changed to the High side. The upshift by the upshift phase is performed by the variator 20. The change rate of the speed ratio in the upshift phase is set within a range in which the primary rotation speed Npri is lowered with the increase of the vehicle speed VSP during the upshift phase.

Since the change rate of the speed ratio is set as above, the stepped shifting is in a shifting form in which an increase and a decrease of the primary pulley rotation speed is repeated as illustrated in FIG. 3. For simplification, only a full load line (a shifting line in the case of the accelerator opening degree APO=8/8) is illustrated in FIG. 3. The stepped shifting is performed on the basis of the shifting line set for each accelerator opening degree.

In the stepped shifting, when the primary rotation speed Npri reaches the first predetermined rotation speed set for each accelerator opening degree, the upshift phase is executed, and after the upshift is executed until a second predetermined rotation speed set for each accelerator opening degree in accordance with the vehicle speed VSP is reached, the shifting suppression phase is executed, the through speed ratio is not changed, and the primary rotation speed Npri (engine rotation speed) gradually increases with the increase of the vehicle speed VSP. In FIG. 3, an example in which the first predetermined rotation speed is made constant while the second predetermined rotation speed is set in accordance with the vehicle speed VSP is illustrated, but this is not limiting, and the first predetermined rotation speed may be set in accordance with the vehicle speed VSP or the second predetermined rotation speed may be set constant.

In the stepped shifting, a second mode switching shifting line which is a gear position switching line for switching the gear position of the auxiliary transmission mechanism 30 from the first speed to the second speed is set on the Low side from the first mode switching shifting line, and when the operation point of the transmission 4 crosses the second mode switching shifting line, that is, when the target through speed ratio changes across the second mode switching shifting line, the coordinated shifting is performed similarly to the normal shifting, the gear position of the auxiliary transmission mechanism 30 is switched from the first speed to the second speed, and the speed ratio of the variator 20 is changed to the Low side.

The second mode switching shifting line is set as follows. First, a through speed ratio before start of the upshift phase at which the through speed ratio immediately after completion of the upshift phase becomes the low-speed mode Highest speed ratio is calculated for each accelerator opening degree at the stepped shifting start opening degree or more. Then, the through speed ratio before start of the upshift phase which is the Lowest side speed ratio among them and the zero point in the lower left corner of the shifting map are connected to each other. In this way, the second mode switching shifting line is set. A speed ratio on the Low side by more than the change rate of the speed ratio in the upshift phase may be calculated with respect to the low-speed mode Highest speed ratio for each accelerator opening degree at the stepped shifting start opening degree or more, and the speed ratio on the Lowest side among them may be connected to the zero point in the lower left corner of the shifting map.

When the target through speed ratio changes across the second mode switching shifting line during the upshift, the coordinated shifting is made to complete until the next shifting suppression phase is completed. Thus, when the target through speed ratio crosses the low-speed mode Highest line during the subsequent upshift, the gear position of the auxiliary transmission mechanism 30 has been already at the second speed. That is, the gear position of the auxiliary transmission mechanism 30 has been already at the second speed before the through speed ratio reaches the low-speed mode Highest speed ratio, and the speed ratio of the variator 20 is not the Highest yet. Therefore, the variator 20 can be upshifted across the low-speed mode Highest line in the upshift phase, and if the accelerator opening degree APO is 8/8, for example, the stepped shifting can be performed along the full load line illustrated in FIG. 3.

If the accelerator opening degree APO after stepping-on becomes the stepped shifting start opening degree or more and when the stepped shifting is to be started, the accelerator opening degree APO after stepping-on is on the Low side rather than the low-speed mode Highest speed ratio and on the High side rather than the second mode switching shifting line (the operation point A in FIG. 3, for example), the coordinated shifting is started at the same time as the time when the first shifting suppression phase in the stepped shifting is started.

Figure 4:
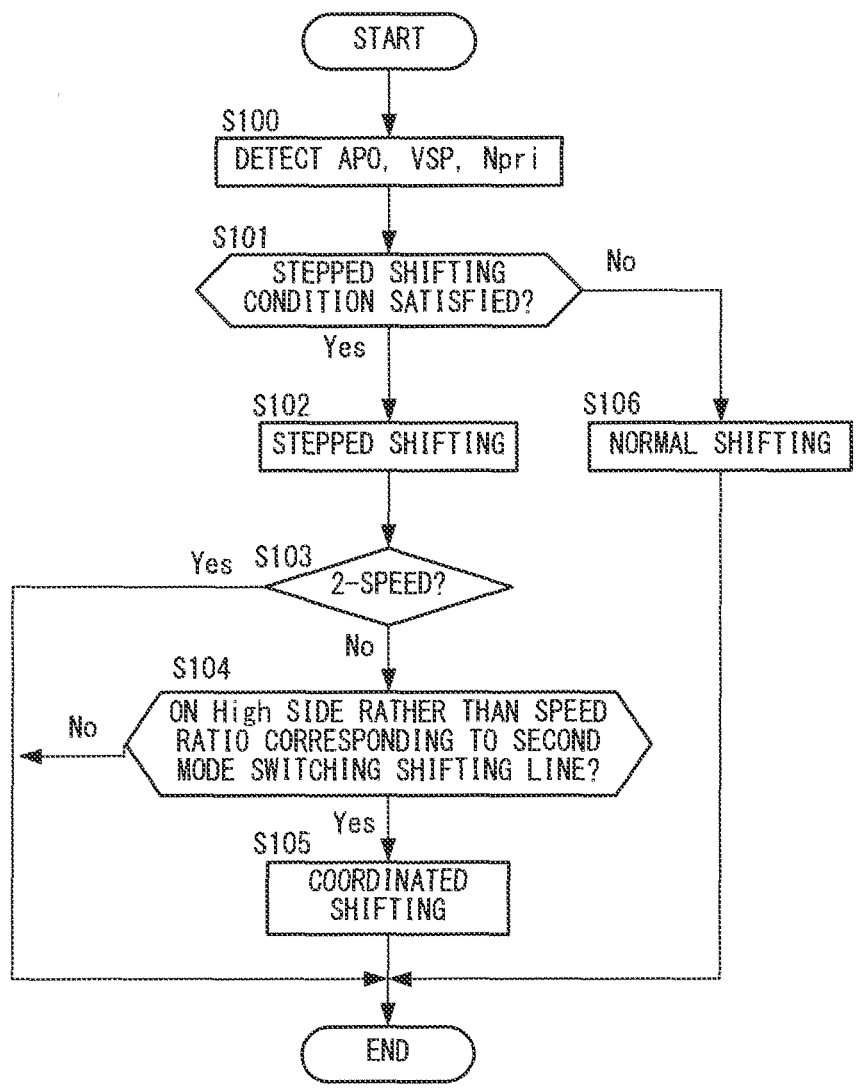
FIG. 4 is a flowchart for explaining shifting control.

Subsequently, the shifting control of this embodiment will be described by using a flowchart in FIG. 4.

At Step S100, the controller 12 detects the accelerator opening degree APO, the vehicle speed VSP, and the primary rotation speed Npri on the basis of the output signal from the accelerator opening degree sensor 41, the output signal from the vehicle speed sensor 43, and the output signal from the rotation speed sensor 42.

At Step S101, the controller 12 determines whether or not the stepped shifting condition (stepped upshift shifting condition) has been satisfied. Specifically, the controller 12 determines whether or not the accelerator opening degree APO is at the stepped shifting start opening degree or more indicated by a one-dot chain line in FIG. 3 on the basis of the vehicle speed VSP and the accelerator opening degree APO. The processing proceeds to Step S102 if the accelerator opening degree APO is at the stepped shifting start opening degree or more or proceeds to Step S106 if the accelerator opening degree APO is at the stepped shifting start opening degree or less.

At Step S102, the controller 12 executes the stepped shifting. As a result, the mode switching shifting line is changed from the first mode switching shifting line to the second mode switching shifting line.

At Step S103, the controller 12 determines whether or not the gear position of the auxiliary transmission mechanism 30 is at the second speed. The processing proceeds to Step S104 if the gear position of the auxiliary transmission mechanism 30 is not at the second speed or the processing this time is finished if the gear position of the auxiliary transmission mechanism 30 is at the second speed.

At Step S104, the controller 12 determines whether or not the target through speed ratio is on the High side rather than the through speed ratio corresponding to the second mode switching shifting line. Specifically, the controller 12 determines whether or not the target through speed ratio has changed across the second mode switching shifting line or due to a change of the mode switching shifting line from the first mode switching shifting line to the second mode switching shifting line, the target through speed ratio which has been on the Low side rather than the low-speed mode Highest speed ratio has changed to the High side rather than the speed ratio corresponding to the second mode switching shifting line. Then, if the target through speed ratio has changed across the second mode switching shifting line or due to the change of the mode switching shifting line from the first mode switching shifting line to the second mode switching shifting line, or if the target through speed ratio has changed to the High side rather than the speed ratio corresponding to the second mode switching shifting line, the controller 12 determines that the target through speed ratio is on the High side rather than the through speed ratio corresponding to the second mode switching shifting line. The processing proceeds to Step S105 if the target through speed ratio is on the High side rather than the through speed ratio corresponding to the second mode switching shifting line, the target through speed ratio is on the Low side rather than the second mode switching shifting line, the processing this time is finished.

At Step S105, the controller 12 executes the coordinated shifting and changes the gear position of the auxiliary transmission mechanism 30 from the first speed to the second speed and also shifts the variator 20 to the Low side at the same time.

At Step S106, the controller 12 executes the normal shifting. If the stepped shifting has been performed, the mode switching shifting line is changed from the second mode switching shifting line to the first mode switching shifting line.

Figure 5:
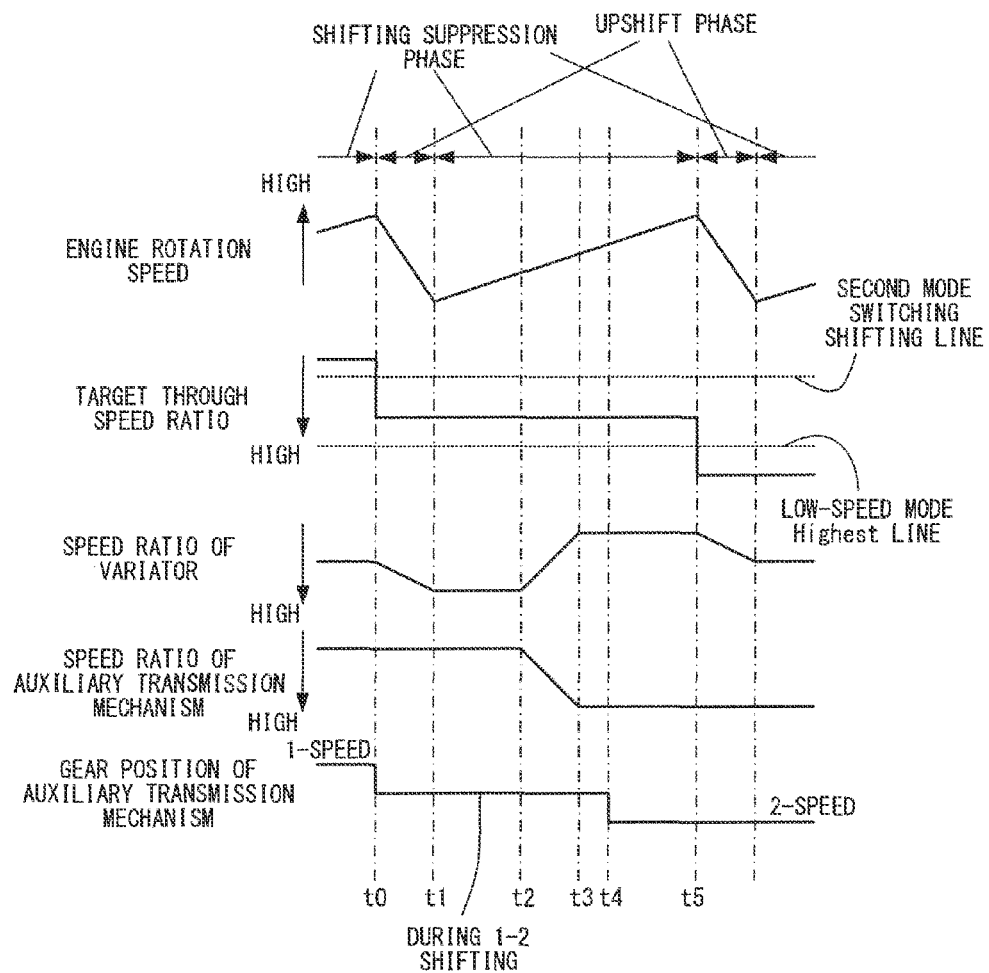
FIG. 5 is a time chart when stepped shifting is performed.

Subsequently, in the shifting control of this embodiment, the speed ratio of the variator 20, the speed ratio of the auxiliary transmission mechanism 30 and the like when the stepped shifting is performed will be described by using the time chart in FIG. 5. Here, it is assumed that the stepped shifting is started, and the gear position of the auxiliary transmission mechanism 30 is at the first speed.

At time t0, since the primary rotation speed Npri has risen to the first predetermined rotation speed, the upshift phase is started, and if the target through speed ratio is changed to the High side across the second mode switching shifting line during the upshift phase, the coordinated shifting is started. As a result, in the auxiliary transmission mechanism 30, the change of the gear position from the first speed to the second speed is started, and the preparation phase and the torque phase are performed. In the auxiliary transmission mechanism 30, the inertia phase has not started yet, and the speed ratio in the auxiliary transmission mechanism 30 is the speed ratio corresponding to the first speed. The variator 20 upshifts by following the target through speed ratio.

At time t1, when the upshift phase is finished, the shifting suppression phase is started, and the target through speed ratio is constant.

At time t2, when the inertia phase is started in the auxiliary transmission mechanism 30, the speed ratio in the auxiliary transmission mechanism 30 is changed from the speed ratio corresponding to the first speed to the speed ratio corresponding to the second speed, and the speed ratio of the variator 20 is changed to the Low side in accordance with that.

At time t3, when the inertia phase is finished in the auxiliary transmission mechanism 30, the end phase is started, and when the end phase is finished at time t4, the gear position of the auxiliary transmission mechanism 30 becomes the second speed.

At time t5, when the shifting suppression phase is finished and the upshift phase is started, and even if the target through speed ratio is changed to the High side across the low-speed mode Highest line during the upshift phase, the gear position of the auxiliary transmission mechanism 30 has been already at the second speed, and the speed ratio of the variator 20 has not become the Highest. Thus, the variator 20 can upshift by following the target through speed ratio.

An effect of the embodiment of the present invention will be described.

The stepped shifting is intended for shifting like that of the stepped transmission which repeats a rise of the driving force (rotation speed) and upshifting with a good rhythmic sense. Thus, if a desired upshift amount cannot be obtained during the stepped shifting, a sense of discomfort caused by insufficient sense of acceleration and loss of a rhythmic sense is given to the driver. In this embodiment, in the case of the stepped shifting, by completing the change of the gear position of the auxiliary transmission mechanism 30 from the first speed to the second speed before the through shifting ratio reaches the low-speed mode Highest speed ratio, even if the through speed ratio is changed to the High side across the low-speed mode Highest line, the speed ratio of the variator 20 is not at the Highest, and the variator 20 can be upshifted across the low-speed mode Highest line in the upshift phase, and the desired upshift amount can be achieved, whereby a sense of discomfort is prevented from being given to the driver.

The through speed ratio before start of the upshift phase is calculated for each accelerator opening degree and the through speed ratio before start of the upshift phase located on the Lowest side among them is connected to the zero point in the lower left corner of the shifting map so that the second mode switching shifting line is set. As described above, by means of a simple constitution in which the second mode switching shifting line is added and the gear position of the auxiliary transmission mechanism 30 is changed on the basis of the second mode switching shifting line, the gear position of the auxiliary transmission mechanism 30 can be changed from the first speed to the second speed before the through shifting ratio reaches the low-speed mode Highest speed ratio.

Moreover, by connecting the auxiliary transmission mechanism 30 to the output shaft of the variator 20, the speed ratio of the variator 20 is at the High side when the coordinated shifting is performed, and the gear position of the auxiliary transmission mechanism 30 is changed in a state in which the input torque to the auxiliary transmission mechanism 30 is small so that a shifting shock when the gear position of the auxiliary transmission mechanism 30 is changed can be suppressed.

By performing the coordinated shifting in the variator 20 during the inertia phase when the gear position of the auxiliary transmission mechanism 30 is changed, separation of the through speed ratio from the speed ratio corresponding to the shifting line is suppressed, and giving of a sense of discomfort to the driver can be also suppressed.

The embodiment of the present invention has been described above, but the aforementioned embodiment only illustrates a part of an application example of the present invention and is not intended to limit the technical scope of the present invention to the specific constitution of the aforementioned embodiment.

In the shifting suppression phase, if the through speed ratio is gradually changed to the High side with the rise of the vehicle speed VSP, a high rotation region with the large driving force can be used longer so that acceleration can be improved. In this case, this upshift (change of the through speed ratio to the High side in the shifting suppression phase) is performed by the variator 20. At that time, if the target through speed ratio crosses the second mode switching shifting line during the shifting suppression phase, the coordinated shifting is executed in the shifting suppression phase the next time. If the coordinated shifting accompanied by the shifting of the auxiliary transmission mechanism 30 is started in the shifting suppression phase when the target through speed ratio crosses the second mode switching shifting line, there is a concern that the coordinated shifting is not finished by start of the upshift phase and the upshift phase cannot be started, but by starting the upshift phase at the time when the primary rotation speed Npri rises to the first predetermined rotation speed, acceleration with a good rhythmic sense can be given.

The auxiliary transmission mechanism 30 may have two gear positions or more. For example, in the case of the stepped transmission mechanism having three gear positions, a mode switching line for stepped shifting is provided for each mode switching line when the gear position is switched from the first speed to the second speed and from the second speed to the third speed.

Moreover, it may be so constituted that the through speed ratio before start of the upshift phase at which the through speed ratio immediately after completion of the upshift phase becomes the low-speed mode Highest speed ratio is calculated for each accelerator opening degree, and each of the through speed ratios before start of the upshift phase is connected so as to set the second mode switching shifting line. As a result, the second mode switching shifting line can be set on the High side as much as possible, and the shifting shock when the gear position of the auxiliary transmission mechanism 30 is switched can be suppressed.

With respect to this variation, if the second mode switching shifting line of the aforementioned embodiment (a line connecting the through speed ratio before start of the upshift phase which is the speed ratio on the Lowest side and the zero point in the lower left corner of the shifting map) is used, the effect is exerted if the accelerator opening degree APO becomes smaller during the stepped shifting.

Figure 6:
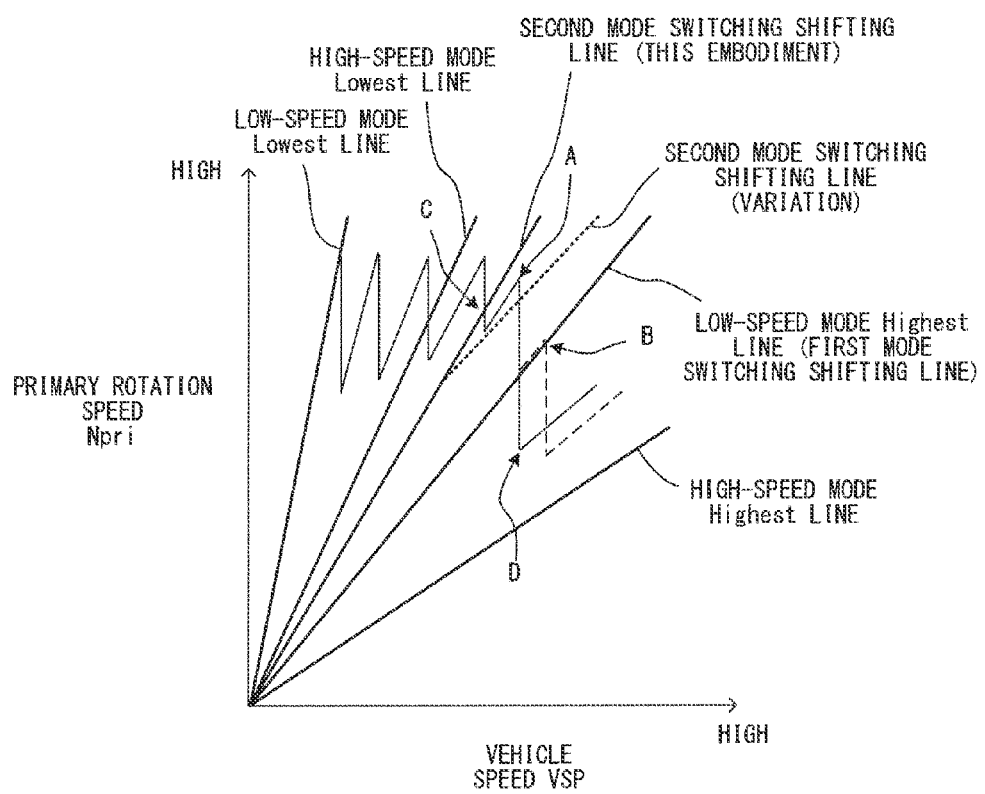
FIG. 6 is a view for explaining shifting in a variation.

When the second mode switching shifting line of the variation is used, the accelerator opening degree APO becomes smaller at an A point in FIG. 6, and if the target through speed ratio crosses the second mode switching shifting line, since it is on the Low side from the second mode switching shifting line at the A point, the gear position of the auxiliary transmission mechanism 30 is at the first speed and thus, the transmission 4 cannot change the through speed ratio to the desired through speed ratio across the low-speed mode Highest line (D point in FIG. 6). Moreover, even if the change of the gear position of the auxiliary transmission mechanism 30 from the first speed to the second speed is started at the same time as the time when the accelerator opening degree APO becomes smaller, the through speed ratio is held at the low-speed mode Highest speed ratio as indicated by a broken line in FIG. 6 while the switching of the gear position is finished. Then, when the gear position of the auxiliary transmission mechanism 30 is changed to the second speed and the variator 20 is shifted to the Low side at a B point in FIG. 6, the variator 20 upshifts to the target through speed ratio according to the accelerator opening degree APO. As described above, if the accelerator opening degree APO becomes smaller, upshift in two stages is performed, which might give a sense of discomfort to the driver.

On the other hand, if the second mode switching shifting line of the aforementioned embodiment is used, since the target through speed ratio crosses the second mode switching shifting line at a C point in FIG. 6, at the A point in FIG. 6 where the accelerator opening degree APO becomes small, the gear position of the auxiliary transmission mechanism 30 is at the second speed, and the variator 20 can upshift to the target through speed ratio according to the accelerator opening degree APO, whereby a sense of discomfort that could occur in the variation is not given to the driver.

In the aforementioned embodiment, the first mode switching shifting line is set to the low-speed mode Highest line, but this is not limiting.

In the aforementioned embodiment, the case in which the belt-type continuously variable transmission mechanism is used is described, but a chain-type continuously variable transmission or the like may be used.

The present application claims for priority based on Japanese Patent Application No. 2013-114641 filed with Japan Patent Office on May 30, 2013, and the entire contents of this application are incorporated in this Description by reference.

The invention claimed is:

1. A transmission, comprising:
    a variator capable of continuously changing a speed ratio;
    a stepped transmission mechanism arranged in series with the variator and in which a gear position is switched; and
    a controller adapted to control a through speed ratio by controlling the variator and the stepped transmission mechanism and to execute stepped shifting by performing repeatedly a shifting suppression phase and an upshift phase when a stepped upshift shifting condition is satisfied, the through speed ratio being a speed ratio of the entire transmission, a change of the through speed ratio being suppressed in the shifting suppression phase, a change of the through speed ratio of the upshift phase being larger than that of the shifting suppression phase, wherein
    when the stepped shifting is not performed, on the basis of the through speed ratio corresponding to a case where the stepped transmission mechanism is at an n-th gear position and a speed ratio of the variator is a highest speed ratio, the controller is configured to cause shifting to be performed from the n-th gear position to an n+1 gear position;
    when the stepped shifting is performed, the controller is configured to start a change from the n-th gear position to the n+1 gear position on the basis of the through speed ratio being set on a low side compared to a case where the stepped shifting is not performed; and
    the change from the n-th gear position to the n+1 gear position of the stepped transmission mechanism is completed before the through speed ratio reaches the highest speed ratio of the variator.

2. The transmission according to claim 1, wherein
    the controller is configured to cause upshifting in variator during the shifting suppression phase; and
    when a change of the gear position is determined on the basis of the through speed ratio, the through speed ratio being set on the low side compared to the through speed ratio in the case where the stepped shifting is not performed, during the shifting suppression phase, a change is made from the nth gear position to the n+1 gear position in the shifting suppression phase which is executed as a next shifting suppression phase.

3. The transmission according to claim 1, wherein
    the stepped transmission mechanism is connected to an output shaft of the variator.

4. The transmission according to claim 1, wherein
    the controller is configured to cause coordinated shifting so as to perform shifting in a direction opposite to a shifting direction in the stepped transmission mechanism in the variator during an inertia phase of the stepped transmission mechanism.

5. A control method adapted to control a transmission provided with:
    a variator capable of continuously changing a speed ratio; and
    a stepped transmission mechanism arranged in series with the variator and in which a gear position is switched, the control method comprising:
        controlling a through speed ratio by controlling the variator and the stepped transmission mechanism, the through speed ratio being a speed ratio of the entire transmission;

executing stepped shifting to repeatedly perform a shifting suppression phase and an upshift phase when a stepped upshift shifting condition is satisfied, a change of the through speed ratio being suppressed in the shifting suppression phase, a change of the through speed ratio of the upshift phase being larger than that of the shifting suppression phase;

when the stepped shifting is not performed, on the basis of the through speed ratio corresponding to a case where the stepped transmission mechanism is at an n-th gear position and a speed ratio of the variator is a highest speed ratio, performing shifting from the n-th gear position to an n+1 gear position;

when the stepped shifting is performed, starting a change from the n-th gear position to the n+1 gear position on the basis of the through speed ratio being set on a low side compared to a case where the stepped shifting is not performed; and completing the change from the n-th gear position to the n+1 gear position of the stepped transmission mechanism before the through speed ratio reaches the highest speed ratio of the variator.

6. A transmission, comprising:

a variator capable of continuously changing a speed ratio;

a stepped transmission mechanism arranged in series with the variator and in which a gear position is switched; and shifting control means for controlling a through speed ratio by controlling the variator and the stepped transmission mechanism and for executing stepped shifting by performing repeatedly a shifting suppression phase and an upshift phase when a stepped upshift shifting condition is satisfied, the through speed ratio being a speed ratio of the entire transmission, a change of the through speed ratio being suppressed in the shifting suppression phase, a change of the through speed ratio of the upshift phase being larger than that of the shifting suppression phase, wherein when the stepped shifting is not performed, on the basis of the through speed ratio corresponding to a case where the stepped transmission mechanism is at an n-th gear position and a speed ratio of the variator is a highest speed ratio, the shifting control means performs shifting from the n-th gear position to an n+1 gear position;

when the stepped shifting is performed, the shifting control means starts a change from the n-th gear position to the n+1 gear position on the basis of the through speed ratio being set on a low side compared to a case where the stepped shifting is not performed; and the change from the nth gear position to the n+1 gear position of the stepped transmission mechanism is completed before the through speed ratio reaches the highest speed ratio of the variator.

\* \* \* \* \*